United States Patent
Czaplicki et al.

(10) Patent No.: US 7,313,865 B2
(45) Date of Patent: Jan. 1, 2008

(54) PROCESS OF FORMING A BAFFLING, SEALING OR REINFORCEMENT MEMBER WITH THERMOSET CARRIER MEMBER

(75) Inventors: Michael J. Czaplicki, Rochester, MI (US); Jon Riley, Farmington, MI (US); David Carlson, Rochester Hills, MI (US)

(73) Assignee: ZEPHYROS, Inc., Romeo, MI (US)

( * ) Notice: Subject to any disclaimer, the term of this patent is extended or adjusted under 35 U.S.C. 154(b) by 447 days.

(21) Appl. No.: 10/712,069

(22) Filed: Nov. 13, 2003

(65) Prior Publication Data

US 2004/0143969 A1 Jul. 29, 2004

Related U.S. Application Data

(60) Provisional application No. 60/443,108, filed on Jan. 28, 2003.

(51) Int. Cl.
*B21D 47/02* (2006.01)
*B29C 44/12* (2006.01)
*B29C 44/18* (2006.01)

(52) U.S. Cl. .................. 29/897.2; 29/897; 29/527.1; 29/460; 264/46.5; 264/46.6; 264/45.3; 296/187.02

(58) Field of Classification Search .................. 29/897, 29/897.2, 897.32, 527.1, 460; 296/187.02, 296/193.06; 156/321, 309.9; 264/46.5, 264/46.6, 45.3

See application file for complete search history.

(56) References Cited

U.S. PATENT DOCUMENTS

| | | | |
|---|---|---|---|
| 3,162,086 A | 12/1964 | Wells | |
| 3,692,620 A * | 9/1972 | Schmidt | 442/181 |
| 4,463,870 A | 8/1984 | Coburn, Jr. et al. | |
| 4,610,836 A | 9/1986 | Wycech | |
| 4,751,249 A | 6/1988 | Wycech | |
| 4,769,391 A | 9/1988 | Wycech | |
| 4,810,548 A | 3/1989 | Ligon, Sr. et al. | |
| 4,813,690 A | 3/1989 | Coburn, Jr. | |
| 4,836,516 A | 6/1989 | Wycech | |
| 4,853,270 A | 8/1989 | Wycech | |
| 4,861,097 A | 8/1989 | Wycech | |
| 4,922,596 A | 5/1990 | Wycech | |
| 4,923,902 A | 5/1990 | Wycech | |

(Continued)

FOREIGN PATENT DOCUMENTS

| | | |
|---|---|---|
| DE | 37 22 873 A | 4/1989 |
| DE | 198 12 288 C1 | 5/1999 |
| DE | 299 04 705 U1 | 7/1999 |
| DE | 198 56 255 C1 | 1/2000 |
| DE | 198 58 903 A1 | 6/2000 |

(Continued)

OTHER PUBLICATIONS

Born et al., Structural Bonding in Automotive Applications.

(Continued)

*Primary Examiner*—David P. Bryant
*Assistant Examiner*—Sarang Afzali
(74) *Attorney, Agent, or Firm*—Dobrusin & Thennisch PC

(57) ABSTRACT

There is disclosed a member for reinforcing, sealing or baffling a structure of an article of manufacture such as an automotive vehicle. The member preferably includes a carrier member and an activatable (e.g., expandable, curable or both) material disposed upon a surface of the carrier member. The carrier member is preferably formed of a thermosettable material such as a molding compound (e.g., a sheet or bulk molding compound).

21 Claims, 2 Drawing Sheets

U.S. PATENT DOCUMENTS

| | | | |
|---|---|---|---|
| 4,978,562 A | 12/1990 | Wycech | |
| 5,124,186 A | 6/1992 | Wycech | |
| 5,266,133 A | 11/1993 | Hanley et al. | |
| 5,358,397 A | 10/1994 | Ligon et al. | |
| 5,474,721 A | 12/1995 | Stevens | |
| 5,506,025 A | 4/1996 | Otto et al. | |
| 5,575,526 A | 11/1996 | Wycech | |
| 5,631,027 A | 5/1997 | Takabatake | |
| 5,642,914 A | 7/1997 | Takabatake | |
| 5,678,826 A | 10/1997 | Miller | |
| 5,707,473 A * | 1/1998 | Agrawal et al. | 156/245 |
| 5,725,272 A | 3/1998 | Jones | |
| 5,755,486 A * | 5/1998 | Wycech | 296/187.02 |
| 5,766,719 A | 6/1998 | Rimkus | |
| 5,767,177 A * | 6/1998 | Omente et al. | 523/447 |
| 5,829,482 A | 11/1998 | Takabatake | |
| 5,884,960 A | 3/1999 | Wycech | |
| 5,888,600 A | 3/1999 | Wycech | |
| 5,931,474 A | 8/1999 | Dawes et al. | |
| 5,932,680 A | 8/1999 | Heider | |
| 5,937,486 A | 8/1999 | Bockenheimer | |
| 5,985,435 A | 11/1999 | Czaplicki et al. | |
| 5,992,923 A | 11/1999 | Wycech | |
| 6,003,274 A | 12/1999 | Wycech | |
| 6,006,484 A | 12/1999 | Geissbuhler | |
| 6,033,300 A | 3/2000 | Schneider | |
| 6,059,342 A | 5/2000 | Kawai et al. | |
| 6,068,424 A | 5/2000 | Wycech | |
| 6,079,180 A | 6/2000 | Wycech | |
| 6,092,864 A | 7/2000 | Wycech et al. | |
| 6,093,358 A | 7/2000 | Schiewe et al. | |
| 6,096,403 A | 8/2000 | Wycech et al. | |
| 6,099,948 A | 8/2000 | Paver Jr. | |
| 6,103,341 A * | 8/2000 | Barz et al. | 428/147 |
| 6,114,004 A * | 9/2000 | Cydzik et al. | 428/81 |
| 6,131,897 A | 10/2000 | Barz et al. | |
| 6,146,565 A | 11/2000 | Keller | |
| 6,149,227 A | 11/2000 | Wycech | |
| 6,150,428 A | 11/2000 | Hanley, IV et al. | |
| 6,165,588 A | 12/2000 | Wycech | |
| 6,168,226 B1 | 1/2001 | Wycech | |
| 6,189,953 B1 | 2/2001 | Wycech | |
| 6,196,621 B1 | 3/2001 | VanAssche | |
| 6,199,940 B1 | 3/2001 | Hopton et al. | |
| 6,233,826 B1 | 5/2001 | Wycech | |
| 6,237,304 B1 | 5/2001 | Wycech | |
| 6,253,524 B1 | 7/2001 | Hopton et al. | |
| 6,263,635 B1 | 7/2001 | Czaplicki | |
| 6,267,436 B1 | 7/2001 | Takahara | |
| 6,270,600 B1 | 8/2001 | Wycech | |
| 6,272,809 B1 | 8/2001 | Wycech | |
| 6,276,105 B1 | 8/2001 | Wycech | |
| 6,281,260 B1 | 8/2001 | Hanley, IV et al. | |
| 6,287,666 B1 | 9/2001 | Wycech | |
| 6,296,298 B1 | 10/2001 | Barz | |
| 6,305,136 B1 | 10/2001 | Hopton et al. | |
| 6,311,452 B1 | 11/2001 | Barz et al. | |
| 6,315,938 B1 | 11/2001 | Jandali | |
| 6,319,964 B1 | 11/2001 | Blank et al. | |
| 6,321,793 B1 | 11/2001 | Czaplicki et al. | |
| 6,332,731 B1 * | 12/2001 | Wycech | 403/171 |
| 6,341,467 B1 | 1/2002 | Wycech | |
| 6,357,819 B1 | 3/2002 | Yoshino | |
| 6,358,584 B1 | 3/2002 | Czaplicki | |
| 6,368,438 B1 | 4/2002 | Chang et al. | |
| 6,372,334 B1 | 4/2002 | Wycech | |
| D457,120 S | 5/2002 | Broccardo et al. | |
| 6,382,635 B1 | 5/2002 | Fitzgerald | |
| 6,383,610 B1 | 5/2002 | Barz et al. | |
| 6,387,470 B1 | 5/2002 | Chang et al. | |
| 6,389,775 B1 | 5/2002 | Steiner et al. | |
| 6,406,078 B1 | 6/2002 | Wycech | |
| 6,413,611 B1 | 7/2002 | Roberts et al. | |
| 6,419,305 B1 | 7/2002 | Larsen | |
| 6,422,575 B1 | 7/2002 | Czaplicki et al. | |
| 6,435,601 B2 | 8/2002 | Takahara | |
| H2047 H | 9/2002 | Harrison et al. | |
| 6,444,713 B1 | 9/2002 | Pachi et al. | |
| 6,451,231 B1 | 9/2002 | Harrison et al. | |
| 6,455,146 B1 | 9/2002 | Fitzgerald | |
| 6,467,834 B1 | 10/2002 | Barz et al. | |
| 6,471,285 B1 | 10/2002 | Czaplicki et al. | |
| 6,474,722 B2 | 11/2002 | Barz | |
| 6,474,723 B2 | 11/2002 | Czaplicki et al. | |
| 6,475,577 B1 | 11/2002 | Hopton et al. | |
| 6,478,367 B2 | 11/2002 | Ishikawa | |
| 6,482,486 B1 | 11/2002 | Czaplicki et al. | |
| 6,482,496 B1 | 11/2002 | Wycech | |
| 6,491,336 B1 | 12/2002 | Beckmann et al. | |
| 6,502,821 B2 | 1/2003 | Schneider | |
| 6,519,854 B2 | 2/2003 | Blank | |
| 6,523,857 B1 | 2/2003 | Hopton et al. | |
| 6,523,884 B2 | 2/2003 | Czaplicki et al. | |
| 6,546,693 B2 | 4/2003 | Wycech | |
| 6,550,847 B2 | 4/2003 | Honda et al. | |
| 6,561,571 B1 | 5/2003 | Brennecke | |
| 6,573,309 B1 | 6/2003 | Reitenbach et al. | |
| 6,575,526 B2 | 6/2003 | Czaplicki et al. | |
| 6,607,238 B2 | 8/2003 | Barz | |
| 6,619,727 B1 | 9/2003 | Barz et al. | |
| 6,634,698 B2 | 10/2003 | Kleino | |
| 6,641,208 B2 | 11/2003 | Czaplicki et al. | |
| 6,668,457 B1 | 12/2003 | Czaplicki | |
| 6,692,347 B1 | 2/2004 | Schneider | |
| 6,708,979 B2 | 3/2004 | Stratman et al. | |
| 6,722,720 B2 | 4/2004 | Donick et al. | |
| 6,729,425 B2 | 5/2004 | Schneider | |
| 6,777,049 B2 | 8/2004 | Sheldon et al. | |
| 6,786,533 B2 | 9/2004 | Bock et al. | |
| 6,793,274 B2 | 9/2004 | Riley et al. | |
| 6,838,509 B2 | 1/2005 | Shimo et al. | |
| 6,851,232 B1 | 2/2005 | Schwegler | |
| 6,880,657 B2 | 4/2005 | Schneider et al. | |
| 6,890,021 B2 | 5/2005 | Bock et al. | |
| 6,905,745 B2 | 6/2005 | Sheldon et al. | |
| 6,921,130 B2 | 7/2005 | Barz et al. | |
| 6,928,736 B2 | 8/2005 | Czaplicki et al. | |
| 6,932,421 B2 | 8/2005 | Barz | |
| 6,938,947 B2 | 9/2005 | Barz et al. | |
| 6,941,719 B2 | 9/2005 | Busseuil et al. | |
| 6,953,219 B2 | 10/2005 | Lutz et al. | |
| 7,011,315 B2 | 3/2006 | Czaplicki et al. | |
| 7,025,409 B2 | 4/2006 | Riley et al. | |
| 7,077,460 B2 | 7/2006 | Czaplicki et al. | |
| 7,105,112 B2 | 9/2006 | Czaplicki et al. | |
| 7,114,763 B2 | 10/2006 | Riley et al. | |
| 7,141,194 B1 | 11/2006 | Beckmann | |
| 7,144,071 B2 | 12/2006 | Le Gall et al. | |
| 2001/0020794 A1 | 9/2001 | Ishikawa | |
| 2001/0042353 A1 | 11/2001 | Honda et al. | |
| 2002/0042468 A1 * | 4/2002 | Choi et al. | 524/494 |
| 2002/0053179 A1 | 5/2002 | Wycech | |
| 2002/0074827 A1 | 6/2002 | Fitzgerald et al. | |
| 2002/0096833 A1 | 7/2002 | Czaplicki et al. | |
| 2002/0160130 A1 | 10/2002 | Sheldon et al. | |
| 2002/0164450 A1 | 11/2002 | Lupini et al. | |
| 2002/0174954 A1 | 11/2002 | Busseuil et al. | |
| 2003/0001469 A1 | 1/2003 | Hankins et al. | |
| 2003/0039792 A1 | 2/2003 | Hable et al. | |
| 2003/0042056 A1 | 3/2003 | Schneider et al. | |
| 2003/0050352 A1 | 3/2003 | Guenther et al. | |
| 2003/0057737 A1 | 3/2003 | Bock et al. | |
| 2003/0069335 A1 | 4/2003 | Czaplicki et al. | |
| 2003/0090129 A1 | 5/2003 | Riley et al. | |

| | | | | | | |
|---|---|---|---|---|---|---|
| 2003/0140671 A1 | 7/2003 | Lande et al. | | GB | 2 375 328 A | 11/2002 |
| 2003/0144409 A1 | 7/2003 | Kassa et al. | | JP | 10-45031 | 2/1998 |
| 2003/0176128 A1 | 9/2003 | Czaplicki et al. | | JP | 10-71628 | 3/1998 |
| 2003/0183317 A1 | 10/2003 | Czaplicki et al. | | JP | 2000-52444 | 2/2000 |
| 2003/0184121 A1 | 10/2003 | Czaplicki et al. | | JP | 2001-62833 | 3/2001 |
| 2003/0186049 A1 | 10/2003 | Czaplicki et al. | | JP | 2001-88739 | 4/2001 |
| 2003/0201572 A1 | 10/2003 | Coon et al. | | JP | 2001-199362 | 7/2001 |
| 2003/0209921 A1 | 11/2003 | Coon et al. | | JP | 2002-120250 | 4/2002 |
| 2003/0218019 A1 | 11/2003 | Le Gall et al. | | JP | 2002-362412 | 12/2002 |
| 2004/0011282 A1 | 1/2004 | Meyers et al. | | WO | WO 95/32110 | 11/1995 |
| 2004/0018341 A1 | 1/2004 | Richardson et al. | | WO | WO 97/02967 | 1/1997 |
| 2004/0018353 A1 | 1/2004 | Czaplicki et al. | | WO | WO 97/43501 | 11/1997 |
| 2004/0031164 A1 | 2/2004 | Sevastian | | WO | WO 98/50221 | 11/1998 |
| 2004/0033344 A1 | 2/2004 | Czaplicki et al. | | WO | WO 99/08854 | 2/1999 |
| 2004/0034982 A1 | 2/2004 | Wieber et al. | | WO | WO 99/28575 | 6/1999 |
| 2004/0046423 A1 | 3/2004 | Wieber | | WO | WO 99/48746 | 9/1999 |
| 2004/0051251 A1 | 3/2004 | Hankins et al. | | WO | WO 99/50057 | 10/1999 |
| 2004/0056472 A1 | 3/2004 | Schneider | | WO | WO 00/03894 | 1/2000 |
| 2004/0074150 A1 | 4/2004 | Wycech | | WO | WO 00/13958 | 3/2000 |
| 2004/0075299 A1 | 4/2004 | Wieber et al. | | WO | WO 00/27920 | 5/2000 |
| 2004/0076831 A1 | 4/2004 | Hable | | WO | WO 00/37302 | 6/2000 |
| 2004/0124553 A1* | 7/2004 | Czaplicki et al. .......... 264/46.4 | | WO | WO 00/38863 | 7/2000 |
| 2004/0143969 A1 | 7/2004 | Czaplicki | | WO | WO 00/40815 | 7/2000 |
| 2004/0212220 A1 | 10/2004 | Riley et al. | | WO | WO 00/43254 | 7/2000 |
| 2004/0217626 A1 | 11/2004 | Barz et al. | | WO | WO 00/46461 | 8/2000 |
| 2004/0227377 A1 | 11/2004 | Gray | | WO | WO 00/55444 | 9/2000 |
| 2005/0212332 A1 | 9/2005 | Sheldon et al. | | WO | WO01/19667 A1 | 3/2001 |
| 2005/0218697 A1 | 10/2005 | Barz et al. | | WO | WO 01/30906 A1 | 5/2001 |
| 2005/0276970 A1 | 12/2005 | Busseuil et al. | | WO | WO 01/54936 A1 | 8/2001 |
| 2006/0006695 A1 | 1/2006 | Lutz et al. | | WO | WO 01/71225 A1 | 9/2001 |
| 2006/0019595 A1 | 1/2006 | Lewis et al. | | WO | WO 01/83206 A1 | 11/2001 |
| 2006/0021697 A1 | 2/2006 | Riley et al. | | WO | WO 01/88033 A1 | 11/2001 |
| 2006/0057333 A1 | 3/2006 | Brahim | | WO | WO 02/055923 A2 | 7/2002 |
| 2006/0267378 A1 | 11/2006 | Czaplicki et al. | | WO | WO 03/042024 A1 | 5/2003 |
| | | | | WO | WO 03/047951 A1 | 6/2003 |
| | FOREIGN PATENT DOCUMENTS | | | WO | WO 03/051676 | 6/2003 |
| EP | 0 421 277 A1 | 4/1991 | | WO | WO 03/089221 A1 | 10/2003 |
| EP | 0611778 B1 | 9/1997 | | WO | WO03/093387 A1 | 11/2003 |
| EP | 0 891 918 A1 | 1/1999 | | WO | WO2004/060984 | 7/2004 |
| EP | 0 893 331 A1 | 1/1999 | | WO | WO2004/078451 | 9/2004 |
| EP | 0 893 332 A1 | 1/1999 | | WO | WO2004/113153 | 12/2004 |
| EP | 1 084 816 A2 | 3/2001 | | WO | WO2005/077634 A2 | 8/2005 |
| EP | 1 134 126 B1 | 3/2001 | | WO | WO2005/105405 | 11/2005 |
| EP | 1 122 156 A2 | 8/2001 | | WO | WO2005/113689 | 12/2005 |
| EP | 1 149 679 A | 10/2001 | | | | |
| EP | 1 031 496 B1 | 12/2001 | | | OTHER PUBLICATIONS | |
| EP | 0 893 332 B1 | 3/2002 | | | | |
| EP | 1 362 683 A2 | 11/2003 | | | | |
| EP | 1 362 769 A1 | 11/2003 | | | | |
| EP | 1 428 744 | 6/2004 | | | | |
| EP | 1 475 295 A2 | 11/2004 | | | | |
| EP | 1 591 224 A1 | 2/2005 | | | | |
| EP | 1 157 916 B1 | 10/2005 | | | | |
| EP | 1 458 594 B1 | 3/2006 | | | | |
| EP | 1 666 228 A2 | 6/2006 | | | | |
| FR | 2 749 263 A1 | 12/1997 | | | | |
| GB | 2 216 081 A | 10/1989 | | | | |

OTHER PUBLICATIONS

Hopton et al., Application of a Structural Reinforcing Material to Improve Vehicle NVH Characteristics.
Lilley et al., Comparison of Preformed Acoustic Baffles and Two-Component Polyurethane Foams for Filling Body Cavities.
Lilley et al., A Comparison of NVH Treatments for Vehicle Floorplan Applications.
Lilley et al., Vehicle Acoustic Solutions.
Mansour et al., Optimal Bonding Thickness for Vehicle Stiffness.
International Search Report dated Jun. 24, 2004. PCT/US2004/000386 (1001.132).

* cited by examiner

PROCESS OF FORMING A BAFFLING, SEALING OR REINFORCEMENT MEMBER WITH THERMOSET CARRIER MEMBER

CLAIM OF BENEFIT OF FILING DATE

The present application claims the benefit of the filing date of U.S. Provisional Application Ser. No. 60/443,108, filed Jan. 28, 2003, hereby incorporated by reference.

FIELD OF THE INVENTION

The present invention relates generally to a baffling, sealing or reinforcement member that includes a thermoset carrier member and a method of forming the same.

BACKGROUND OF THE INVENTION

For many years, the transportation industry has been concerned with innovation of members for sealing, reinforcing or baffling structures of articles of manufacture such as automotive vehicles. Innovation of such members typically include improving characteristics such as strength, weight, cost, ease of formation, combinations thereof or the like or the like of the members. In the interest of continuing such innovation, the present invention seeks to provide an improved member for sealing, reinforcing or baffling and a method of forming the member.

SUMMARY OF THE INVENTION

Accordingly, there is provided a member for sealing, reinforcing or baffling and a method for forming and/or using the member. According to the method, there is provided a structure of an article of manufacture such as a pillar of an automotive vehicle. The structure will typically have one or more walls, which may define a cavity within the structure. For forming the sealing, baffling or reinforcement member, a thermosettable material is typically provided for forming a carrier member. The thermosettable material is preferably selected from a sheet molding compound, a bulk molding compound, a phenolic resin or a combination thereof. The thermosettable material is typically molded to form the carrier member. In one embodiment, the molding includes compressing the thermosettable material in a heated mold. An activatable material is typically applied to a surface of the carrier member for forming the reinforcement, sealing or baffling member. In one embodiment, the step of applying the activatable material includes: i) contacting the activatable material with the surface of the carrier member as a temperature of the carrier member declines from the elevated temperature achieved during the molding step, such contacting thereby softening a portion of the activatable material with the heat of the carrier member to wet the surface of the carrier member; and ii) allowing the softened portion of the activatable material to harden or solidify and adhere the activatable material to the carrier member. Once formed, the sealing, baffling or reinforcement member is typically placed adjacent to the structure of the article of manufacture (e.g., within a cavity of a pillar structure of an automotive vehicle). Thereafter, the activatable material is preferably expanded to form a structural foam that is adhered to the carrier member and the surface or walls of the structure of the automotive vehicle.

DETAILED DESCRIPTION OF THE PREFERRED EMBODIMENT

Figure 1A:
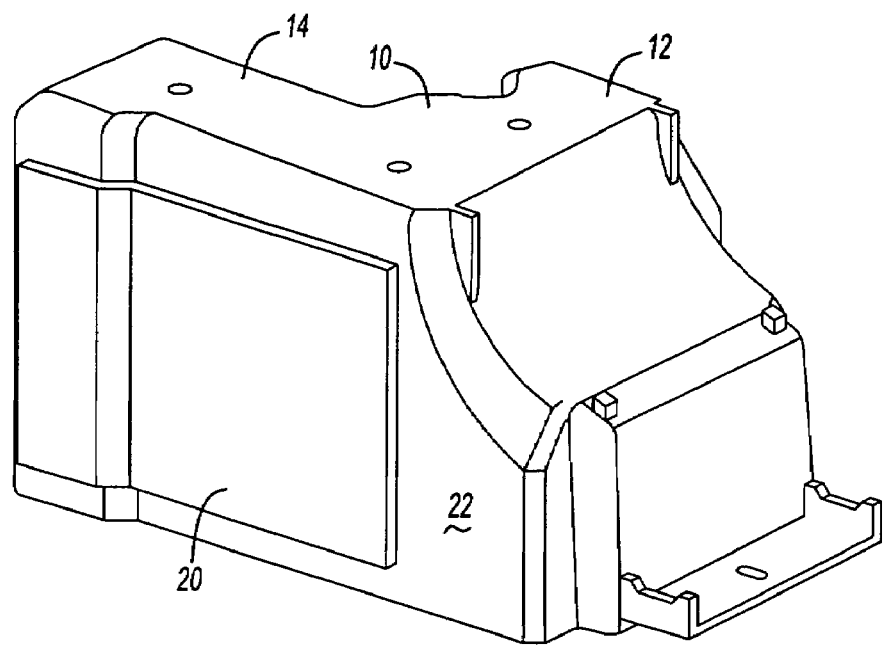
FIG. 1A is a perspective view of an exemplary reinforcement member formed in accordance with an aspect of the present invention.

The present invention is predicated upon an improved process for forming a baffling, sealing or reinforcement member, and articles incorporating the same. Although it is contemplated that the member may be employed in a variety of articles of manufacture, for exemplary purposes, the member is discussed herein as being employed in an automotive vehicle. The process for forming the baffling, sealing or reinforcement member and for applying the member to an automotive vehicle preferably includes one or a combination of the following steps:

i) providing a material (e.g. a thermosettable material) such as a sheet molding compound, a bulk molding compound, a phenolic resin or the like;

ii) molding the material to form a carrier member;

iii) applying an activatable (e.g., expandable) material to a surface of the carrier member for forming the baffling, sealing or reinforcement member;

iv) placing the baffling, sealing or reinforcement member within a cavity or adjacent to a surface of an article of manufacture (e.g., an automotive vehicle), the cavity or surface preferably being defined by one or more walls of a structure of the article of manufacture; and v) activating the activatable material to expand, cure or both and form a structural foam that is adhered to the carrier member and the surface or walls of the structure of the automotive vehicle.

Polymeric Material for the Carrier Member

The material for the carrier member may include any polymer such as a plastic, an elastomer, a thermoplastic, a thermosettable polymer a combination thereof or the like. The material may also include one or more non-polymeric materials such as additives and fillers. In preferred embodiments, the material for the carrier is a polymeric thermosettable material such as a molding compound (e.g., a sheet molding compound, a bulk molding compound, a phenolic resin based compound or the like) which includes up to at least about 30% or more by weight thermosettable resin, more preferably at least about 45% by weight thermosettable resin and even more preferably at least about 60% by weight thermosettable resin. In alternative embodiments, the material for the carrier may include the same amounts or more of a thermoformable thermoplastic material.

It is contemplated that nearly any molding compound may be suitable for the material of the carrier member. Typically, the molding compound, whether sheet molding compound, bulk molding compound or otherwise, will include a thermosettable resin, a reinforcement material and a curing (e.g., cross-linking) agent. The molding compound may also include various other ingredients or components such as fillers, additives or the like.

The thermosettable resin typically includes a substantial amount of polymeric material, which is preferably includes or is based upon a polyester, a vinyl ester, an epoxy, a terephthalate (e.g., cyclic poly(butylene terephthalate)), combinations thereof or the like. The thermosettable resin is typically at least about 15% by weight of the molding compound or less and up to about 75% by weight of the molding compound or more. Preferably, the thermosettable resin is between about 30% and about 60% by weight of the molding compound.

The curing agent will depend upon the type of polymeric material employed for the thermosettable resin. Preferably, the curing agent is effective to cure or cross-link the polymeric material of the thermosettable resin under condition of heat and/or pressure. Exemplary curing agents include, without limitation, free radical initiators, organometallics (e.g., metal oxides) or the like and preferably are selected from oxide catalysts, peroxide catalysts, polyhydric initiators or the like. The curing agent is typically at least about 0.1% by weight of the molding compound or less and up to about 30% by weight of the molding compound or more. Preferably, the curing agent is between about 2% and about 20% by weight of the molding compound.

Various reinforcement materials may be employed in the molding compound of the present invention. Examples of reinforcement material include various different configurations of material such as strands of material, frameworks of material, matrices of material or the like. Preferably, the reinforcement material is provide as fibers of material. Examples of such fibers include, without limitation, polymeric fibers, metal fibers, carbon fibers, graphite fibres, ceramic fibers, natural fibers (e.g., hemp or jute) combinations thereof or the like. Specific examples include without limitation, polyamide (e.g., nylon, aromatic polyamide and polyamideimide) fibers, aramid fibers, polyester fibers, glass fibers, silicon carbide fibers, alumina fibers, titanium fibers, steel fibers, carbon fibers and graphite fibers or the like. Alternatively, the reinforcement material may be provided using the above materials but in a different form, such as chopped fiber, particulate, foam, woven, or unwoven fabric, mat, cordage, or otherwise. It is also contemplated that non-fibrous materials may be employed in the present invention. When used, reinforcement materials are preferably about 1% or less to about 60% or greater by weight of the molding compound and are more preferably about 10% to about 40% by weight of the molding compound.

The fibers for the reinforcement material may be highly variable in length depending on the molding compound and depending upon the processing that the molding compound will undergo. It is contemplated that that the molding compound of the present invention may include a substantial amount (e.g. greater than about 50%, 70%, 90% or more) of the fibers having lengths of up to and greater than about 1 inch, more preferably greater than about 1.5 inches and still more preferably greater than about 2.0 inches. Such fibers are preferably glass, but may be any of the fibers discussed herein.

Exemplary additives, which may be used in the molding compound include, without limitation, viscosity modifiers, low profile or anti-shrink agents, corrosion inhibitors, flexibility modifying agents, mold release agents, phase stabilizing agents, UV stabilizers, plasticizers, fire-retardants, lubricants, anti-oxidants, mold releases or the like. When included, such additives typically represent anywhere from up to at least about 0.01% by weight of the molding compound to about 15% by weight of the compound or greater.

The molding compound may also include one or more fillers. Exemplary fillers include, among others, fumed silicate, titanium dioxide, calcium carbonate, talc, chopped fibers, fly ash, glass microspheres, micro-balloons, crushed stone, nanoclay, linear polymers, monomers, glass or plastic microspheres, silica materials, magnesium oxide, magnesium hydroxide, calcium oxide, calcium hydroxide. When included, fillers typically represent up to about 70% by weight or more of the molding compound. Preferably, the molding compound includes between about 5% and about 60% by weight fillers, more preferably between about 10% and about 50% by weight fillers and even more preferably between about 20% and about 40% by weight fillers.

Forming the Molding Compound into the Carrier Member

It is contemplated that the carrier member may be formed, shaped or both according to a variety of techniques such as extrusion or the like to form the carrier member. It is preferable, however, for the carrier member to be formed or shaped via a molding process. The molding process employed can depend upon the shape desired for the carrier member, the molding compound that is to be shaped or the like. Exemplary molding processes include compression molding, injection molding, blow molding or the like.

According to a first exemplary preferred process, the carrier member is molded between a plurality of mold dies that form a mold. As an example, a first die and a second die of a mold are preferably provided, each having one or more cavities with contours suitable for forming the molding compound to a desired configuration. The first and second dies are heated to elevate the temperature of the molds to between about 150° F. and about 600° F. and more preferably between about 200° F. and about 450° F. For forming the carrier member, the molding compound is located between the dies and the dies are closed about the molding compound or injected after the dies are closed. Preferably, the dies compress the molding compound within the cavities between the first and second dies such that the molding compound assumes the shape of the cavities. While located between the dies, the molding compound cures typically by cross-linking, which is brought about by the elevated mold temperatures, pressures or both, thereby forming the carrier member. Preferably, the molding compound is allowed to cure in the mold for about 30 seconds to about 5 minutes and more preferably for about 1.0 minutes to about 3 minutes.

For this first process, the molding compound is preferably provided as sheet molding compound (SMC) or bulk molding compound (BMC). When provided, the sheet or bulk molding compound may be contacted by (e.g., sandwiched between) one or a pair of films, which may be removed prior to placement of the molding compound between the molds. Advantageously, a molding compound processed according to the first process can include fibers of reinforcement material that are relatively lengthy as described above.

According to a second exemplary process, a mold is heated to an elevated temperature, which is preferably between about 150° F. and about 600° F. and more preferably between about 200° F. and about 450° F. For forming, a molding compound, preferably bulk molding compound (BMC), is injected through an opening in the mold while the mold is closed. When the mold is closed, it preferably forms an internal cavity having substantially the desired shape for the carrier member. Upon injection into the mold under pressurized conditions, the molding compound preferably assumes the shape of the mold cavity (i.e., the shape of the carrier member). While in the mold, the molding compound cures typically by cross-linking, which is brought about by the elevated temperatures, pressures or both, thereby forming the carrier member. Preferably, the molding compound is allowed to cure for about 30 seconds to about 5 minutes and more preferably for about 1.0 minutes to about 3 minutes.

In either of the processes, the mold may be opened after formation of the carrier member and the carrier member may be removed. It is contemplated that the carrier member may be removed from the mold either manually or automatically.

Structurally, the carrier member may be formed in a variety of shapes and configurations depending upon the mold employed to form the member. Exemplary configurations for carrier members are disclosed in U.S. patent application Ser. No. 09/502,686, filed Feb. 11, 2000, titled "Structural Reinforcement System for Automotive Vehicles", which is expressly incorporated herein by reference for all purposes.

The carrier member may be formed in nearly any desired shape or configuration. The carrier member may include one or more ribs for improving strength to weight characteristics or ratios of the carrier member. The carrier member may be elongated, non-elongated, symmetrical, non-symmetrical, contoured, non-contoured or otherwise.

Figure 1B:
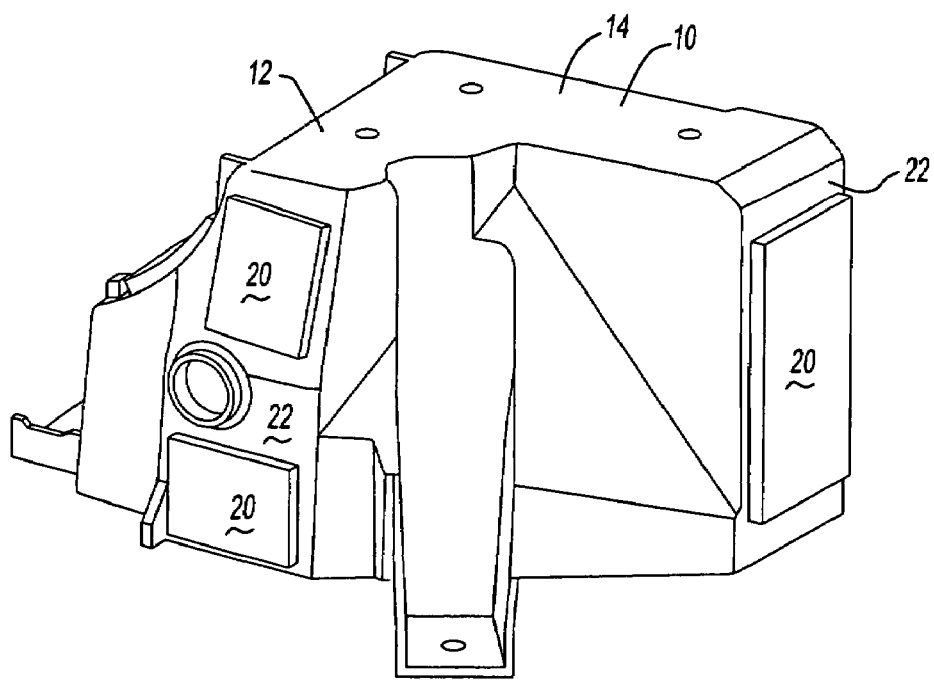
FIG. 1B is another perspective view of the exemplary reinforcement member of FIG. 1A.

Referring to FIGS. 1A and 1B, there is illustrated one exemplary carrier member 10 formed in accordance with the present invention. Typically, the carrier member 10 has a shell configuration, which forms an internal cavity. In the embodiment shown, the carrier member 10 includes a first substantially rectangular block shaped portion 12 and a second substantially block shaped portion 14. As shown, the portions 12, 14 are generally configured perpendicular to each other. The particular carrier member 10 illustrated is configured for insertion into a D-pillar of an automotive vehicle. It should be appreciated that the carrier member 10 shown is but one of a myriad of different carrier members that may be formed according to the present invention and each of the different carrier members may be configured for placement in or adjacent a myriad of components of a myriad of different articles of manufacture.

Activable (e.g., Expandable, Curable or Both) Material to the Carrier Member to Form a Reinforcement, Sealing or Baffling Member When used in automotive vehicles or other articles of manufacture, it is preferable for the activatable material to be an expandable material that can be applied to the carrier member of the invention for forming a baffling, sealing or reinforcement member. Generally, it is contemplated that the expandable material may be placed upon any surface of any carrier member formed in accordance with the present invention. In FIG. 1, for exemplary purposes, there are shown various pieces 20 (e.g., strips) of expandable material disposed upon various surfaces 22 of the carrier member 10.

The expandable material may be formed of several different materials. Generally speaking, the present invention may utilize technology and processes for the forming and applying the expandable material such as those disclosed in U.S. Pat. Nos. 4,922,596, 4,978,562, 5,124,186, and 5,884,960 and commonly owned, co-pending U.S. application Ser. No. 09/502,686 filed Feb. 11, 2000 and Ser. No. 09/524,961 filed Mar. 14, 2000, all of which are expressly incorporated by reference for all purposes. In one embodiment, the expandable material is formed of a high compressive strength and stiffness heat activated reinforcement material having foamable characteristics. The material may be generally dry to-the touch or tacky and can be placed upon a carrier member or the like in any form of desired pattern, placement, or thickness, but is preferably of substantially uniform thickness. One exemplary expandable material is L-5218 structural foam available through L&L Products, Inc. of Romeo, Mich.

Though other heat-activated materials are possible for the expandable material, a preferred heat activated material is an expandable polymer or plastic, and preferably one that is foamable with adhesive characteristics. A particularly preferred material is an epoxy-based structural foam. For example, and without limitation, the structural foam may be an epoxy-based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules.

A number of epoxy-based structural reinforcing, sealing or baffling foams are known in the art and may also be used to produce the desired foam. A typical foam (e.g., structural foam) includes a polymeric base material, such as an epoxy resin or ethylene-based polymer which, when compounded with appropriate ingredients (typically a blowing and curing agent), expands and cures in a reliable and predictable manner upon the application of heat or the occurrence of a particular ambient condition. From a chemical standpoint for a thermally-activated material, the structural foam is usually initially processed as a flowable thermoplastic material before curing. It will cross-link upon curing, which makes the material incapable of further flow.

An example of a preferred structural foam formulation is an epoxy-based material that is commercially available from L&L Products of Romeo, Mich., under the designations L5206, L5207, L5208, L5218. One advantage of the preferred structural foam materials over prior art materials is that the preferred materials can be processed in several ways. The preferred materials can be processed by injection molding, extrusion compression molding or with a mini-applicator. This enables the formation and creation of part designs that exceed the capability of most prior art materials. In one preferred embodiment, the structural foam (in its uncured state) generally is dry or relatively free of tack to the touch and can easily be attached to the carrier member through fastening means which are well known in the art.

While the preferred materials for fabricating the expandable material have been disclosed, the expandable material can be formed of other materials provided that the material selected is heat-activated or otherwise activated by an ambient condition (e.g. moisture, pressure, time or the like) and cures in a predictable and reliable manner under appropriate conditions for the selected application. One such material is the epoxy based resin disclosed in U.S. Pat. No. 6,131,897, the teachings of which are incorporated herein by reference, filed with the United States Patent and Trademark Office on Mar. 8, 1999 by the assignee of this application. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. See also, U.S. Pat. Nos. 5,766,719; 5,755,486; 5,575,526; and 5,932,680, (incorporated by reference).

It is also contemplated that a two component material may be employed wherein the interaction of the two components with the optional addition of heat results in foaming and curing. In such an embodiment, a first component is typically maintained separate from a second component until foaming is desired. Examples of desirable first component/second component systems include without limitation polyurethane/isocyanate systems, epoxy/amine systems and epoxy/acid systems.

In general, the desired characteristics of the expandable material 30 include relatively high stiffness, high strength, high glass transition temperature (typically greater than 70 degrees Celsius), and adhesion durability properties. In this manner, the material does not generally interfere with the materials systems employed by automobile manufacturers. Exemplary materials include materials sold under product designation L5207 and L5208, which are commercially available from L & L Products, Romeo, Mich.

In applications where the expandable material is a heat activated, thermally expanding material, an important consideration involved with the selection and formulation of the material comprising the structural foam is the temperature at which a material reaction or expansion, and possibly curing, will take place. For instance, in most applications, it is undesirable for the material to be reactive at room temperature or otherwise at the ambient temperature in a production line environment. More typically, the structural foam becomes reactive at higher processing temperatures, such as those encountered in an automobile assembly plant, when the foam is processed along with the automobile components at elevated temperatures or at higher applied energy levels, e.g., during paint or e-coat curing steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. If needed, blowing agents, blowing agent activators, curing agents and accelerators can be incorporated into the composition to cause activation (e.g., expansion and/or curing) at different temperatures outside the above ranges.

Generally, suitable expandable foams have a range of expansion ranging from approximately 0 to over 1000 percent. The level of expansion of the expandable material 30 may be increased to as high as 1500 percent or more. Typically, strength and stiffness are obtained from products that possess low expansion.

Some other possible materials for the expandable material 30 include, but are not limited to, polyolefin materials, copolymers and terpolymers with at least one monomer type an alpha-olefin, phenol/formaldehyde materials, phenoxy materials, and polyurethane. See also, U.S. Pat. Nos. 5,266,133; 5,766,719; 5,755,486; 5,575,526; 5,932,680; and WO 00/27920 (PCT/US 99/24,795) (all of which are expressly incorporated by reference). In general, the desired characteristics of the resulting material include relatively low glass transition point, and good adhesion durability properties. In this manner, the material does not generally interfere with the materials systems employed by automobile manufacturers. Moreover, it will withstand the processing conditions typically encountered in the manufacture of a vehicle, such as the e-coat priming, cleaning and degreasing and other coating processes, as well as the painting operations encountered in final vehicle assembly.

In another embodiment, the expandable material is provided in an encapsulated or partially encapsulated form, which may comprise a pellet, which includes an expandable foamable material, encapsulated or partially encapsulated in an adhesive shell. An example of one such system is disclosed in commonly owned, co-pending U.S. application Ser. No. 09/524,298 ("Expandable Pre-Formed Plug"), hereby incorporated by reference.

In addition, as discussed previously, preformed patterns may also be employed such as those made by extruding a sheet (having a flat or contoured surface) and then die cutting it according to a predetermined configuration in accordance with the chosen pillar structure, door beam, carrier member or the like, and applying it to thereto.

The skilled artisan will appreciate that the system may be employed in combination with or as a component of a conventional sound blocking baffle, or a vehicle structural reinforcement system, such as is disclosed in commonly owned co-pending U.S. application Ser. Nos. 09/524,961 or 09/502,686 (hereby incorporated by reference).

It is contemplated that the material of the expandable material could be delivered and placed into contact with the assembly members, through a variety of delivery systems which include, but are not limited to, a mechanical snap fit assembly, extrusion techniques commonly known in the art as well as a mini-applicator technique as in accordance with the teachings of commonly owned U.S. Pat. No. 5,358,397 ("Apparatus For Extruding Flowable Materials"), hereby expressly incorporated by reference. In this non-limiting embodiment, the material or medium is at least partially coated with an active polymer having damping characteristics or other heat activated polymer, (e.g., a formable hot melt adhesive based polymer or an expandable structural foam, examples of which include olefinic polymers, vinyl polymers, thermoplastic rubber-containing polymers, epoxies, urethanes or the like) wherein the foamable or expandable material can be snap-fit onto the chosen surface or substrate; placed into beads or pellets for placement along the chosen substrate or member by means of extrusion; placed along the substrate through the use of baffle technology; a die-cast application according to teachings that are well known in the art; pumpable application systems which could include the use of a baffle and bladder system; and sprayable applications.

In one preferred embodiment, the expandable material is applied to the carrier member while the carrier member is still hot from being formed or molded. In the embodiment, the carrier member is typically removed from its mold or other formation device to the surrounding environment while the carrier member is at an elevated temperature. The elevated temperature of the carrier member, upon removal, is typically at or near the temperature of the mold and the elevated temperature declines toward room temperature (e.g., the temperature of the surrounding environment) after removal.

While the carrier member temperature is declining toward room temperature, one or more pieces of expandable material are contacted with one or more surfaces of the carrier member within a relatively short period of time after removal of the carrier member from the mold. Upon contact, heat from the carrier member softens and/or melts a portion of the one or more pieces of expandable material such that the expandable material wets one or more surfaces of the carrier member. In turn, the carrier member continues to decline in temperature allowing the softened or melted portion to harden and adhere to the carrier member.

The amount of time allowed to pass and the temperature of the surrounding environment after removal of the carrier member from the mold will typically dictate the temperature of the carrier member upon application of the expandable material. The desired temperature for the carrier member upon application of the expandable material is typically between about 80° C. and about 200° C., more preferably between about 100° C. and about 170° C. and still more preferably between about 120° C. and about 150° C. Moreover, such temperatures can typically be achieved in a time period between about 5 seconds or less and about 20 minutes or more and more preferably between about 20 seconds and about 2 minutes after removal of the carrier member from the mold into a surround environment at about room temperature (e.g., between about 10° C. and about 40° C.). Of course, it is contemplated that these times and temperatures can vary widely depending upon the expandable material, the heat of the carrier member once removed from the mold, the temperature of the surrounding environment, the carrier member size or shape, combinations thereof or the like. As discussed herein, application of the expandable material occurs after removal of the carrier member from the mold, however, it is also contemplated that the carrier member may remain at least partially within the mold for application of the expandable material thereto.

While the present invention may be practiced without a re-heating step, it is also contemplated that a re-heating step may be employed if the temperature of the carrier member is allowed to drop below the desired temperature. As an example, it may be desirable to roughen (e.g., by sanding, scraping, sandblasting or the like) one or more surfaces of the carrier member for assisting in bonding the expandable material to the carrier member. However, such roughening can cause cooling of the carrier member such that re-heating is desired prior to applying the expandable material to the carrier. It should be understood, however, that the carrier member may still be considered to be declining from the elevated temperature achieved during the molding step as long as the carrier is not allowed to reach the temperature of its surrounding environment prior to re-heating.

Contacting of the expandable material with the carrier member may be achieved according to a variety of techniques, which may be automatic, semi-automatic, manual or combinations thereof. According to one embodiment, the expandable material is supplied as one or more pieces of appropriately shaped (e.g., die-cut strips) expandable material that preferably corresponds to one or more surfaces of the carrier member. Once cut, an individual can then contact the one or more pieces with the one or more surfaces of the carrier member directly. Alternatively, an individual may place the pieces of expandable material upon a fixture and place the carrier member adjacent to (e.g., contacting or supported by) the fixture such that the pieces of expandable material contact the one or more surfaces of the carrier member.

Figure 2A:
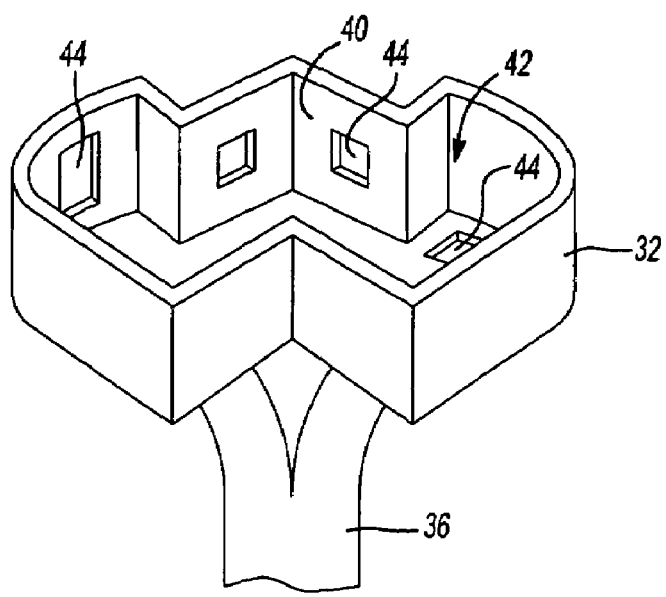
FIG. 2A is a perspective view of an exemplary fixture in accordance with an aspect of the present invention.

Referring to FIG. 2A, there is illustrated one exemplary fixture 30 suitable for receiving and supporting a carrier member such that expandable material may be adhered to the carrier member. The fixture 30 includes a support member 32 and, optionally, a stand 36 for supporting the support member 32.

In the illustrated embodiment, the support member 32 defines a contoured support surface 40, which is shown as being concave and defining a main cavity 42, but which could also be substantially planar, substantially convex or combinations of convex, concave and planar. The support surface 40 is preferably configured to correspond to one or more surfaces of a carrier member such that the carrier member can be received upon and supported by the support surface 40 in a predetermined position relative to the support member 32.

As shown, the support member 32, and particularly the support surface 40, define one or a plurality of cavities 44 suitable for receiving and supporting one or a plurality of pieces (e.g., strips) of expandable material. In operation, the strips of expandable material are placed within the cavities 44. Thereafter, the carrier member is contacted with the support surface 40 and, preferably, the cavities 44 are sufficiently shallow such that the pieces of expandable material contact and adhere to the surfaces of the carrier member as described above to form the reinforcement, sealing or baffling member.

Figure 2B:
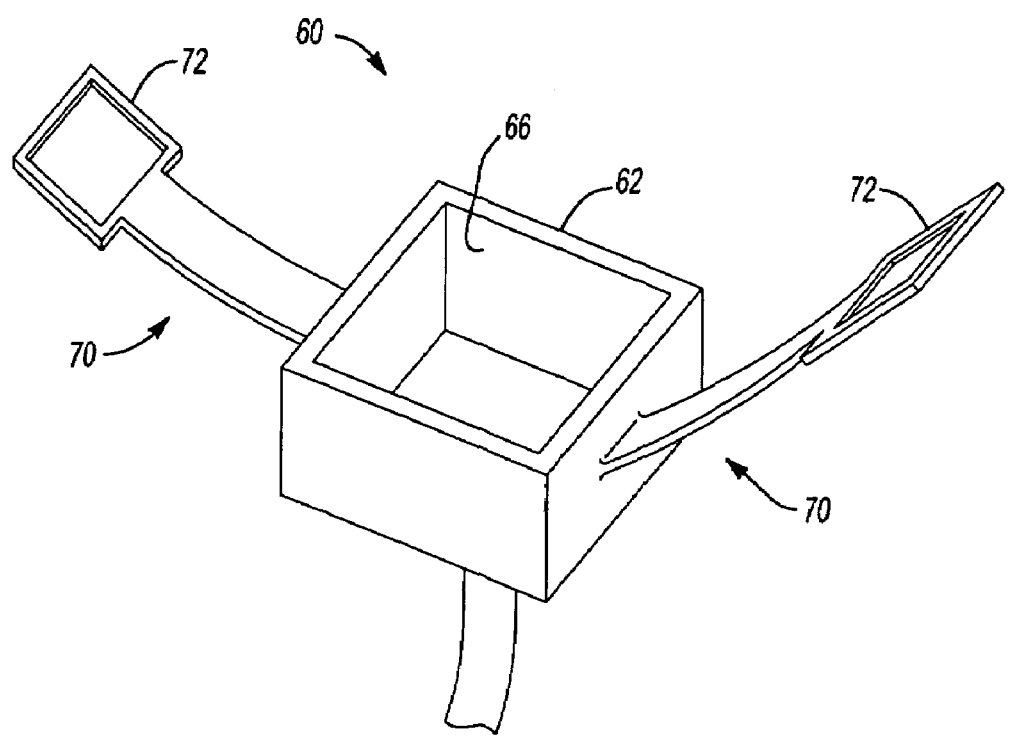
FIG. 2B is a perspective view of another exemplary fixture in accordance with an aspect of the present invention.

Referring to FIG. 2B, there is illustrated another fixture 60 suitable for receiving and supporting a carrier member. The fixture 60 includes a support member 62 and a support surface 66 suitable for receiving and supporting a carrier member such that expandable material may be adhered to the carrier member.

Functionally, it is contemplated that the support member 62 and support surface 66 of the fixture 60 may include one or more cavities such as the cavities 44 of the support member 32 of FIG. 2A and may operate in a substantially identical manner as the support member 32 and support surface 40 of FIG. 2A. In addition, however, the fixture 60 of FIG. 2B includes one or more arms 70 having one or more support portions 72. In operation, a carrier member is placed upon the support surface 66, the support member 62 or both and pieces of expandable material are placed upon the support portions 72 of the arms. Thereafter, the arms 70 are actuated to contact the pieces of expandable material with one or more surfaces of the carrier member such that the pieces of expandable material can adhere to the carrier member substantially as described herein for forming a reinforcement, sealing or baffling member. It is contemplated that a variety of motion systems, which may be manual, automatic or a combination thereof, may be employed for actuating the arms 70. For example, spring assemblies, hinges, motors, electrical or electromechanical systems or the like.

Installing the Sealing, Baffling or Reinforcement Member To an Article of Manufacture Once completed, the member of the present invention is preferably installed to an automotive vehicle although it may be employed for other articles of manufacture such as boats, buildings, furniture, storage containers or the like. The member may be used to reinforce seal or baffle a variety of components of an automotive vehicle including, without limitation, body components (e.g., panels), frame components (e.g., hydroformed tubes), pillar structures (e.g., A, B, C or D-pillars), bumpers, roofs, bulkheads, instrument panels, wheel wells, floor pans, door beams, hem flanges, vehicle beltline applications, doors, door sills, rockers, decklids, hoods or the like of the automotive vehicle.

In one preferred embodiment, the reinforcement, sealing or baffling member is placed at least partially within a cavity of or adjacent to a component or structure of an automotive vehicle wherein the cavity or component is defined by one or more component walls or surfaces. Thereafter the expandable material is activated as described herein to expand, wet, core and adhere to one or more surfaces of the carrier member and one or more surfaces of the component of the automotive vehicle. If reinforcement is desired, the expandable material preferably forms a rigid structural foam securing the member within the cavity of or adjacent to the component structure of the vehicle thereby reinforcing the component.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A process of forming an assembly, the method comprising:
providing a thermosettable material, the material being selected from a sheet molding compound, a bulk molding compound, or a combination thereof wherein the thermosettable material includes a fibrous reinforcement material selected from polymeric fibers, metal fibers, carbon fibers, graphite fibers, polyester fibers, glass fibers, silicon carbide fibers, alumina fibers, titanium fibers, steel fibers or combinations thereof and wherein the fibrous reinforcement material is 1% to 60% by weight of the thermosettable material;
molding the thermosettable material at an elevated temperature to form a carrier member;
applying an activatable material to a surface of the carrier member for forming a reinforcement member wherein the activatable material is a heat foamable material that includes epoxy resin;
placing the reinforcement member within a cavity or adjacent to a surface of an automotive vehicle, the cavity or surface being defined by one or more walls of a structure of the automotive vehicle; and
activating the activatable material to form an epoxy based structural foam that is adhered to the carrier member and the surface or walls of the structure of the automotive vehicle, the structural foam having a high compressive strength.

2. A process as in claim 1 wherein:
i. the structure is a pillar of the automotive vehicle;
ii. the thermosettable material is based upon at least one of a polyester or a vinyl ester;
iii. the step of molding the material is carried out at an elevated temperature in a heated mold;
iv. the reinforcement member, upon activation and adhesion of the activatable material provides reinforcement to the structure of the automotive vehicle.

3. A process as in claim 2 wherein the step of applying the activatable material includes:
i) contacting the activatable material with the surface of the carrier member as a temperature of the carrier member declines from the elevated temperature achieved during the molding step, such contacting thereby softening a portion of the activatable material with the heat of the carrier member to wet the surface of the carrier member; and
ii) allowing the softened portion of the activatable material to harden and adhere the activatable material to the carrier member.

4. A process as in claim 3 wherein the activatable material is applied to the carrier member as a plurality of shaped pieces.

5. A process as in claim 4 wherein the step of applying the activatable material to the carrier member further includes supporting the carrier member with a fixture.

6. A process as in claim 5 wherein the fixture includes a support member and a support surface, the support surface including a plurality of cavities and wherein the contacting of the activatable material with the surface of the carrier member includes placing the plurality of shaped pieces into the plurality of cavities and supporting the carrier member upon the support member such that the pieces contact the surface of the carrier member.

7. A process as in claim 6 wherein the fixture includes one or more actuating arms and wherein the step of contacting the activatable material with the surface of the carrier member include supporting the pieces of activatable material on the one or more arms and actuating the arms to contact the pieces with the surface of the carrier member.

8. A process as in claim 1 wherein the thermosettable material includes a thermosettable resin that is based upon at least one of a polyester, a terephthalate, a vinyl ester, an epoxy or a combination thereof.

9. A process as in claim 8 wherein the thermosettable resin is between about 30% and about 60% by weight of the thermosettable material.

10. A process as in claim 8 wherein the thermosettable material includes a curing agent selected from a free radical initiator, an organometallic, an oxide catalyst, a peroxide catalyst, a polyhidric initiator or a combination thereof.

11. A process as in claim 8 wherein the reinforcement material is glass fibers and the reinforcement material is 10% to 40% by weight of the thermosettable material.

12. A process as in claim 11 wherein greater than about 50% of the fibers have a length greater than about 1.5 inches.

13. A process as in claim 1 wherein the activatable material comprises strips of substantially uniform thickness.

14. A process as in claim 1 wherein the step of molding the thermosettable material includes compressing the molding compound in a die.

15. A process as in claim 14 wherein the mold is heated to a temperature between about 200° F. and about 450° F. for molding the thermosettable material.

16. A process as in claim 1 wherein greater than about 50% of the fibers have a length greater than about 1.5 inches.

17. A process as in claim 1 wherein the thermosettable material includes 10% to 50% by weight fillers selected from fumed silicate, calcium carbonate, talc, chopped fibers, nanoclay and glass or plastic microspheres.

18. A process as in claim 1 wherein the carrier member is formed in a shell configuration that forms an internal cavity within the carrier member.

19. A process as in claim 1 wherein the activatable material comprises multiple strips that are disposed upon various surfaces of the carrier member.

20. A process as in claim 1 wherein the structure of the automotive vehicle is a D-pillar.

21. A process as in claim 1 wherein:
i. the fibrous material includes glass fibers and greater than about 50% of the fibers have a length greater than about 1.5 inches;
ii. the thermosettable material includes 10% to 50% by weight fillers selected from fumed silicate, calcium carbonate, talc, chopped fibers, nanoclay and glass or plastic microspheres;
iii. the carrier member is formed in a shell configuration that forms an internal cavity within the carrier member;
iv. wherein the activatable material comprises multiple strips that are disposed upon various surfaces of the carrier member; and
v. wherein the structure of the automotive vehicle is a D-pillar.

* * * * *